United States Patent [19]
Bender et al.

[11] Patent Number: 6,112,221
[45] Date of Patent: Aug. 29, 2000

[54] SYSTEM AND METHOD FOR SCHEDULING WEB SERVERS WITH A QUALITY-OF-SERVICE GUARANTEE FOR EACH USER

[75] Inventors: Michael A. Bender, St. Louis, Mo.; Soumen Chakarbarti, San Jose, Calif.; Shanmugavelayut Muthukrishnan, New York, N.Y.

[73] Assignee: Lucent Technologies, Inc., N.J.

[21] Appl. No.: 09/112,675

[22] Filed: Jul. 9, 1998

[51] Int. Cl.[7] .................................................. G06F 13/00
[52] U.S. Cl. ............................................................. 709/102
[58] Field of Search ..................................... 709/100, 101, 709/102, 103, 107, 202, 203, 226

[56] References Cited

U.S. PATENT DOCUMENTS

| | | | |
|---|---|---|---|
| 5,812,844 | 10/1998 | Jones et al. | 709/104 |
| 5,944,778 | 8/1999 | Takeuchi et al. | 709/100 |

*Primary Examiner*—Robert B. Harrell

[57] ABSTRACT

In accordance with one embodiment of the invention, a server system computes a feasible stretch value for use in scheduling job requests. A stretch value provides an indication of the delay experienced by each job to complete, when the server processes many jobs concurrently. For a set of job requests, a processing time is calculated for each job request based on, for example, the characteristics of the job and the server system. Thereafter, an estimated stretch value for the set is selected. The server system computes a deadline for each job to be the arrival time of the job request plus the product of the processing time and the estimated stretch value. Thereafter, each job request is scheduled, based on an "earliest deadline first" arrangement, wherein the job request that has the earliest deadline is scheduled first, the job request having the next earliest deadline is scheduled second, etc.

The selected stretch value is deemed feasible if each pending job in the set can be completed prior to its deadline. If the selected stretch value is deemed not feasible, it is adjusted iteratively until an appropriate feasible stretch value is found. The appropriate stretch value is then utilized to schedule the job requests to be serviced or processed by the system. According to one embodiment, the feasible stretch value is adjusted until an optimal feasible stretch value is found, which equals the smallest feasible stretch value which permits all pending jobs to be completed prior to their deadline.

45 Claims, 3 Drawing Sheets

SYSTEM AND METHOD FOR SCHEDULING WEB SERVERS WITH A QUALITY-OF-SERVICE GUARANTEE FOR EACH USER

FIELD OF THE INVENTION

This invention relates generally to web and database servers, and more particularly to scheduling a continuous stream of job requests.

BACKGROUND OF THE INVENTION

Many servers, such as web and database servers, receive a continual stream of job requests requiring vastly different amounts of processing time. The processing times of different jobs can vary over several orders of magnitude. These times can depend, in part, on whether the server system utilizes a non-pre-emptive setting, in which jobs are processed without interruption, or a pre-emptive setting, in which jobs may be suspended and later resumed. In both the pre-emptive and non-pre-emptive cases, though most particularly in the pre-emptive case, each server must produce a schedule which services the continual stream of job requests in the most efficient and "fair" way possible. There are various ways to gauge the efficiency and fairness of a schedule, such as throughput, avoiding jitter, etc., but one indication of fairness is the widely-accepted requirement that the schedule be responsive to each job and avoid starvation of any job.

In order to produce a schedule that optimizes the scheduling of job requests made of a server, several strategies utilizing scheduling metrics, are typically used. Two classical optimization metrics in scheduling theory are makespan and average completion time. The makespan is a suitable measure for batched jobs, and average completion time is useful in some compiler optimization settings. However, neither of these is a suitable measure when jobs arrive in a continuous stream. For jobs arriving continuously, the sum-flow has been considered for the past two decades to be the suitable metric for optimization. The relevant parameter of the sum-flow metric is the time a job spends in the system. The sum-flow metric sums the time all jobs spend in the system. This optimization scheme is the basis for the Shortest Remaining Process Time (hereinafter "SRPT") heuristic, which produces a schedule which minimizes the time it takes to process all of the uncompleted jobs in the system when there is a single processor.

However, as is well known in the industry, the SRPT heuristic has the drawback that it leads to starvation. Starvation occurs when some job request to the server is delayed to an unbounded extent. Although the SRPT heuristic can be desirable in some circumstances, the fact that specific job requests are delayed to an unbounded extent is unfair to the person who made the request which is delayed. Furthermore, the fact that some job requests are delayed to an unbounded extent prevents the owner of the server system from being able to make a quality-of-service guarantee to each user that the schedule will be responsive to each job and avoid starvation of any job.

Therefore, a need exists for a server system which optimizes the scheduling of a continuous stream of jobs request and provides the "fairest" possible service to users, enabling the owner of the server to make a quality-of-service guarantee to each user that the schedule will be responsive to each job and avoid starvation of any job.

SUMMARY OF THE INVENTION

In accordance with one embodiment of the invention, a server system computes a feasible stretch value for use in scheduling job requests. A stretch value provides an indication of the delay experienced by each job to complete, when the server processes many jobs concurrently. For a set of job requests, a processing time is calculated for each job request based on, for example, the characteristics of the job and the server system. Thereafter, an estimated stretch value for the set is selected. The server system computes a deadline for each job to be the arrival time of the job request plus the product of the processing time and the estimated stretch value. Thereafter, each job request is scheduled, based on an "earliest deadline first" arrangement, wherein the job request that has the earliest deadline is scheduled first, the job request having the next earliest deadline is scheduled second, etc.

The selected stretch value is deemed feasible if each pending job in the set can be completed prior to its deadline. If the selected stretch value is deemed not feasible, it is adjusted iteratively until an appropriate feasible stretch value is found. The appropriate stretch value is then utilized to schedule the job requests to be serviced or processed by the system. According to one embodiment, the feasible stretch value is adjusted until an optimal feasible stretch value is found, which equals the smallest feasible stretch value which permits all pending jobs to be completed prior to their deadline.

In accordance with another embodiment of the invention, the set of specifiable job requests comprises a stream of jobs from the first job arrival to the system up to the current job arrival of the system. In accordance with yet another embodiment of the invention, the set of specifiable jobs comprises the last n number of job arrivals, wherein n is an integer. In this embodiment, the feasible stretch value is the maximum stretch value among said n number of job arrivals. In accordance with yet another embodiment of the invention, the feasible stretch value comprises a selected stretch value among the set of job requests times a ratio, which corresponds to the ratio of the largest to the smallest processing time.

BRIEF DESCRIPTION OF THE DRAWINGS

The present invention will be further understood from the following description with reference to the accompanying drawings, in which.

DETAILED DESCRIPTION OF THE INVENTION

The present invention comprises a computer system, more particularly a web or database server which optimizes the scheduling of job requests.

Figure 1:
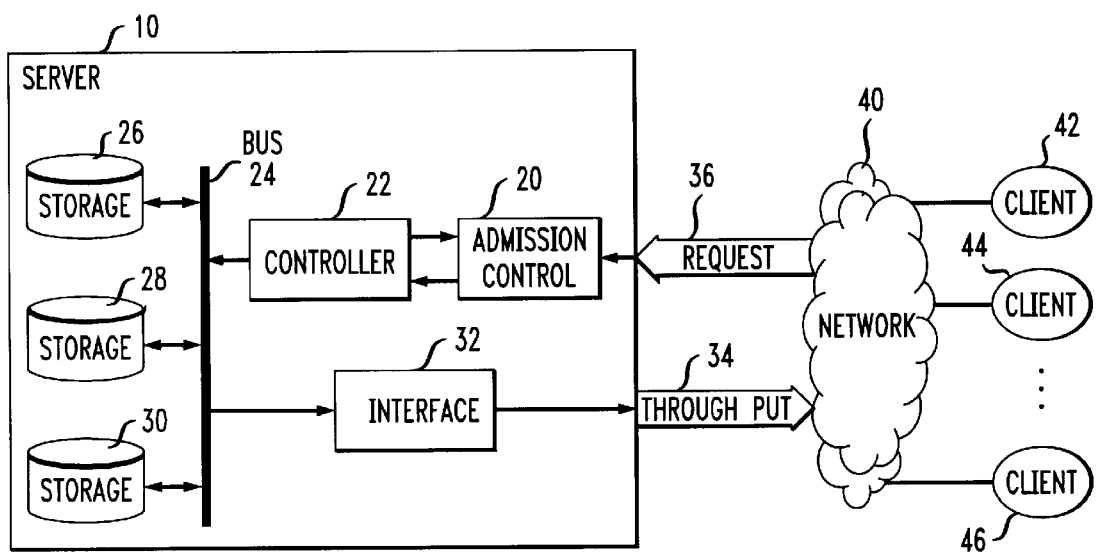
FIG. 1 illustrates a server system that employs various embodiments of the scheduling arrangement in accordance with the present invention.

FIG. 1 illustrates a server system that employs various embodiments of the scheduling arrangement in accordance with the present invention. For example, the scheduling arrangements described in accordance with the present invention may be employed in any server system that is configured to receive a job request from a client.

In FIG. 1, server system 10 is configured to provide data to a plurality of clients, such as 42, 44 and 46 via a communications network 40, in response to requests received from such clients. Network 40 may be any appropriate communication network such as Internet, or an asynchronous transfer mode (ATM) network. Server system 10 includes a plurality of storage devices such as 26, 28 and 30, which are configured to provide a plurality of information such as video image sequences, audio clip sequences and data bytes.

Server system 10 also includes, in one embodiment, an admission control circuit 20, which is configured to analyze an incoming request and determine whether the request will be acknowledged or denied. The request might be denied for any number of reasons, e.g.—the person making the request is not authorized to make the request, the request is incompatible with the server system, etc. In one embodiment of the invention, admission control circuit 20 stores a plurality of the job requests before directing them to controller 22, which is configured to control the operation of server system 10, thus permitting server system 10 to employ a scheduling system. Admission control 20 may know the arrival time of certain job requests before such a job requests arrive at the scheduling system. A scheduling system based on such a storage arrangement is referred to as "off-line" scheduling. Thus, in an off-line scheduling arrangement, the system has knowledge of all the jobs that need to be serviced.

In another embodiment of the invention, admission control circuit 20 stores a specified set of job requests before directing them to controller 22. A scheduling system based on such a storage arrangement is referred to as "on-line" scheduling. An on-line system is one in which the scheduling system must decide the appropriate schedule based only upon jobs which have already been requested. An input port of admission control circuit 20 is coupled to an input bus 36 which is configured to carry requests generated by clients 42–46. Admission control circuit 20 analyzes each job request, among other things, based on the time the request arrives, the length of the request, and the bandwidth or data rate necessary to serve the request.

In accordance with one embodiment of the invention, controller 22 is a microprocessor. An input port of controller 22 is coupled to an output port of admission control circuit 20. Furthermore an output port of controller 22 is coupled to an input port of admission control circuit 20. Controller 22 employs the schedule optimizing metrics of the present invention in order to provide the "fairest" treatment of each job request made of server system 10.

Storage devices 26–30 are configured to provide data to an internal bus system 24 in response to signals provided by controller 22, although the invention is not limited in scope in that respect. For example, other embodiments of server 10 comprise separate disk controllers, each of which typically has a maximum sustainable data rate at which it can provide data retrieved from all the disks it controls. For example, SCSI controllers have a typical sustainable data rate of about 4 megabytes per second, regardless of how many disks are controlled by that SCSI controller. Data retrieved from storage devices 26–30 are provided to network 40 via interface unit 32 and output bus 34.

As stated previously, controller 22 employs a metric in carrying out the present invention. It should also be noted that, although one embodiment of the invention is disclosed in the context of discrete functioning elements such as an admission control circuit, a controller, and a scheduler, it is understood that different discrete functioning elements or software could be employed to carry out the present invention. The scheduling arrangement for both the off-line and the on-line systems are explained in more detail hereinafter in reference with the flow charts illustrated in FIGS. 2 and 3.

Figure 2:
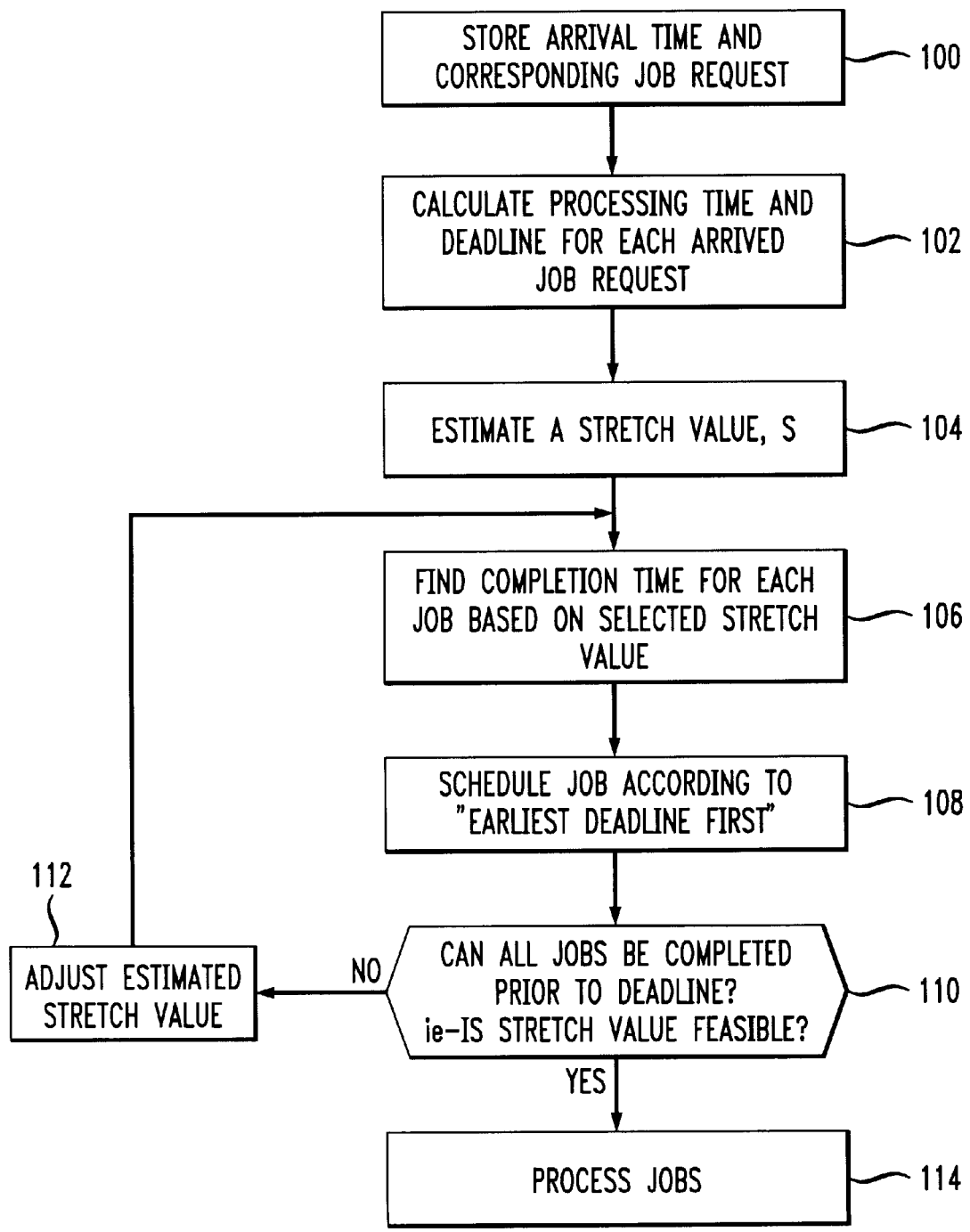
FIG. 2 is a flow chart which illustrates the steps of scheduling and processing a plurality of job requests in the off-line setting by utilizing stretch values, in accordance with one embodiment of the present invention.

For the off-line case, all jobs requests and their arrival times are stored before a job is serviced. FIG. 2 is a flow chart which illustrates the steps of scheduling a plurality of job requests in the off-line setting by utilizing the present invention, as explained hereinafter. At step 100, the arrival time of a job request and the nature of the job is advantageously stored. The arrival time of the job is the point in time when the server receives the job request, and the nature of the job is information regarding the type of data sought by the person making the job request.

At step 102, server system 10 calculates a processing time of the job based on a certain pre-determined criteria. In one embodiment of the invention, for example, the processing time is based on the size of the requested job, e.g. proportional to the size, wherein the number of bytes of data requested indicates to server system 10 that a pre-determined time interval is required to fulfill this particular job request. Thus, for example, server system 10 designates a processing time of one second for a 100 byte job request while designating a processing time of two seconds for a 200 byte job request.

Alternatively, server system 10 may utilize the same proportional processing times as just described while adding an additional pre-determined time period. This pre-determined time period can be arbitrary, but in the preferred embodiment, is determined by the time the system requires for handshaking and other internal functions common to all of the jobs served. Thus, if an additional processing time of one second were added by server system 10 to the job requests in the above example, a two second processing time would be designated to the 100 byte job request, while a three second processing time would be designated to the 200 byte job request. In other embodiments of the invention, server system 10 calculates the processing time for each job request based on different criteria, such as the type of data sought.

At step 104, server system 10 next selects a stretch value to utilize in scheduling the job requests. The estimated stretch value can be a random or arbitrarily chosen number or can be based on previously found stretch values. As discussed previously, a stretch value exists because in one embodiment of the invention, server system 10 employs a pre-emptive setting. In such a setting, the server does not service a particular job request continuously until the particular job request is complete. Instead, server system 10 alternates between a plurality of different pending jobs, servicing portions of each job until eventually all of the jobs are complete. Thus, a stretch value can be defined as a ratio equal to the time that server system 10 requires to service a particular job request while also serving other uncompleted jobs in the system, divided by the time that server system 10 would require to service that particular job if no other uncompleted jobs were required to be served by the system.

Thus, the stretch value, $S_i$, for a single particular job i, is equal to the difference between the completion time of the job, $C_i$, and the arrival time of the job, $A_i$, divided by the processing time of the job, $P_i$, as can be seen in the following equation:

$$\frac{C_i - A_i}{P_i} = S_i$$

It should be noted though that, while this formula demonstrates that a stretch value can exist for an individual job, the stretch value is preferably not calculated separately for each individual job but is instead estimated or selected as a first step for application to an entire set of jobs, as will be fully explained later.

Once step 104 is satisfied and a stretch value has been selected, server system 10 proceeds to step 106. At step 106, server system 10 uses the selected stretch value to calculate the deadlines, $D_i$, for all of the uncompleted jobs in the set. The deadline, $D_i$, is equal to the arrival time, $A_i$, plus the product of the selected stretch value, S (designated as S, rather than $S_i$, because the selected stretch value is applied to all of the job requests in the set, while the use of $S_i$ would inaccurately suggest that job i has a stretch value which is different from other jobs in the set), times the processing time, $P_i$, such that:

$$D_i = S \times P_i + A_i$$

At step 108, once the deadline for each uncompleted job is calculated, server system 10 schedules the jobs in accordance with an earliest deadline first ("EDF") methodology. With an EDF methodology, the first job that server system 10 schedules is the job which has the earliest deadline, as found in step 106, relative to all of the other jobs. It then chooses the job with the next earliest deadline, and schedules it second, and so on until all of the jobs have been scheduled.

At decision step 110, server system 10 inquires whether each and every one of the jobs have completion times which is earlier than each job's respective deadline, as found in step 106. If any job is not able to be completed prior to its deadline, then the estimated stretch value is not feasible and is therefore adjusted at step 112. From step 112, the feasibility of the adjusted stretch value is re-checked by returning to step 106. The method is repeated until a stretch value is found which enables all of the jobs to be completed within their respective deadlines. In one embodiment of the invention, the adjustment to the estimated stretch value is accomplished by doubling the previously selected estimated stretch value. In yet another embodiment, once the system determines that a stretch value falls between two integers, k and 2k, the adjustment to the estimated stretch value is accomplished by performing a binary search for the appropriate value between the two integers. The value which results from the binary search is called the optimal feasible stretch value, since it is the smallest feasible stretch value that permits each and every job request to have a completion time prior to the deadline of each job request. When a feasible stretch value is found, server system 10 proceeds to step 114, where it performs the jobs in the order dictated by the schedule.

Figure 3:
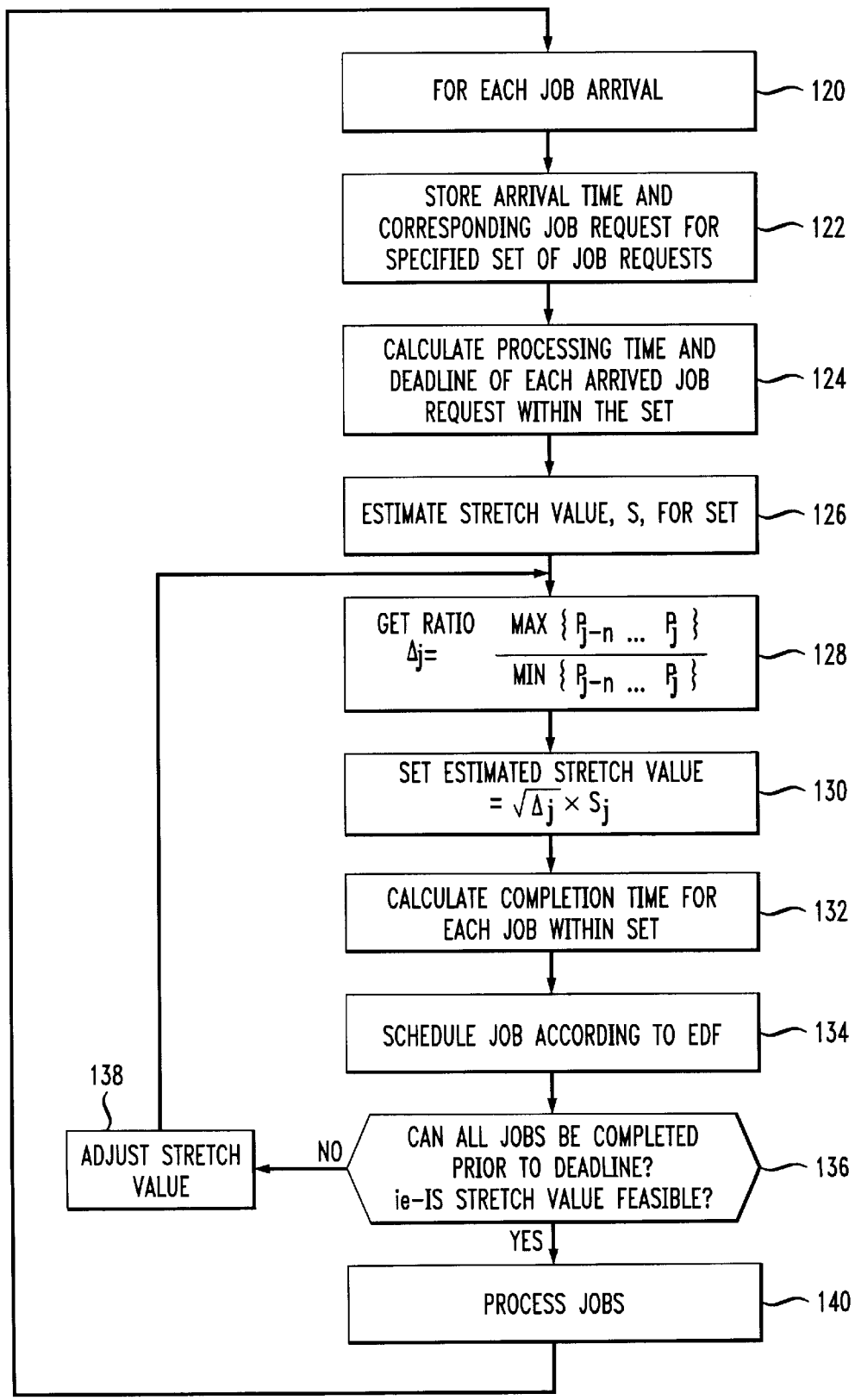
FIG. 3 is a flow chart which illustrates the steps of scheduling and processing a plurality of job requests in the on-line setting by utilizing stretch values, in accordance with one embodiment of the present invention.

FIG. 3 is a flow chart which illustrates another embodiment of the invention, in which server system 10 employs the present invention in an on-line scheduling arrangement. An on-line scheduling arrangement is one which must determine the optimal way to schedule the jobs based upon jobs that have already been received. Thus, a server system which employs an on-line scheduling arrangement begins serving the jobs before knowing the optimal stretch value.

In the on-line setting, server system 10 utilizes a metric called stretch-so-far EDF to carry out the present invention. According to this metric, the server system 10 maintains an estimate of the stretch value, and adjusts the estimate as new jobs arrive. In the preferred embodiment, controller 22 is configured to estimate the stretch value and to implement the stretch-so-far EDF metric.

At step 120, a job arrives at server system 10. At step 122, the arrival time and the nature of the corresponding job request for a specified set of job requests are advantageously stored. The specified set of job requests has n number of job requests, where n is an integer. The value of n is advantageously chosen by the operator of server system 10. While it is possible that n equal the total number of jobs serviced by the system, it may be desirable to avoid the expense of storing and calculating arrival times, and as explained next in step 124, processing times for the entire history at every arrival. Therefore, in the preferred embodiment, n is a finite number in the range of 10 to 100, corresponding to the last 10 to 100 jobs which were serviced by the system immediately proceeding the arrival of the presently arrived job. Not only does the selection of an n value in this range control the cost of scheduling, but also prevents a momentary surge of arrivals a long time ago from inducing the scheduler to compute a large processing time ratio ever after.

At step 124, server system 10 calculates a processing time of each arrived job request within the specified set. As in FIG. 2, the processing time for each job request can be based on a certain pre-determined criteria, such as the time necessary to service the number of bytes requested, with or without a pre-determined time period for handshaking, etc.

At step 126, server system 10 next selects a stretch value, S, to utilize in its scheduling metric. The system seeks to find a stretch value $S_j^*$, which is the optimal stretch value for scheduling all of the uncompleted jobs in the system, within the specified set of job requests, between the arrival of $job_j$ and the subsequent arrival of $job_{(j+1)}$. As shown previously, the stretch value, $S_i$, for a particular jobs, is equal to the difference between the completion time, $C_i$, and the arrival time, $A_i$, divided by the processing time, $P_i$. As noted before, a selected stretch value S, applicable to each and every job in the set, is used by this invention rather than an $S_i$.

Once step 126 is satisfied and a stretch value has been selected, server system 10 proceeds to step 128. At step 128, server system 10 calculates the following ratio:

$$\Delta j = \frac{\max\{P_{j-n} \ldots P_j\}}{\min\{P_{j-n} \ldots P_j\}}$$

which represents the ratio of the maximum processing time for a completed job divided by the minimum processing time for a completed job. As previously discussed, the maximum or minimum processing time can be derived from n number of jobs prior to the present, or most recently arrived $job_j$, where n is an integer. Thus, the minimum and maximum processing time is dependent upon the value of the integer n, since the value of n determines what, or how many, previous processing times are being examined in order to determine the minimum and maximum processing times.

At step 130, an estimated on-line stretch value is calculated as the product of the selected stretch value times value that corresponds to the ratio found in step 128. For example, this value can be represented by the following equation:

$$E[S_j*] = \sqrt{\Delta_j}\, x(S_j)$$

At step 132, server system 10 uses the estimated on-line stretch value to calculate the deadlines, $D_j$, for all of the uncompleted jobs within the set. As previously shown and discussed in FIG. 2, the deadline for a particular job is equal to the arrival time of that particular job plus the product of the selected stretch value found in step 130 times the processing time for that particular job. At step 134, once the deadline for each uncompleted job is calculated, server system 10 then schedules the jobs in accordance with an EDF methodology. Once scheduled, server system 10 proceeds to step 136, where it determines if the selected on-line stretch value permits each and every one of the pending jobs to be completed, i.e.—have a completion time, prior to each of their respective deadlines. If so, the selected on-line stretch value is feasible and the system proceeds to step 140 to process the jobs according to the schedule found in step 134.

If the estimated on-line stretch value does not permit all of the pending jobs to be completed prior to its deadline, then the estimated stretch value is not feasible, and is therefore adjusted at step 138. The feasibility of the on-line stretch value is re-checked by returning to step 128, and the method is repeated until an on-line stretch value is found which enables all of the jobs to be completed within their respective deadlines.

As may be the case, a subsequent job request will arrive to be serviced while server system is processing the existing job requests in accordance with step 140. If this is the case, then server system 10 returns to 120 of the flow chart to re-perform steps 120 through 140 of the flow chart.

While there has been shown and described particular embodiments of the invention, it will be obvious to those skilled in the art that changes and modifications can be made therein without departing from the invention, and therefore, the appended claims shall be understood to cover all such changes and modifications as fall within the true spirit and scope of the invention.

We claim:

1. A method comprising the steps of:
   receiving a plurality of server job requests;
   calculating a deadline, $D_i$, for each of said plurality of job requests, given by $D_i = S \times P_i + A_i$, wherein $P_i$ is a processing time corresponding to each said job request, $A_i$ is an arrival time corresponding to each said job request, and S is a stretch value; and
   scheduling each of said job requests as a function of $D_i$;
   said stretch value being such that a completion time for each said job request can be completed within said deadline corresponding to each said job request.

2. The method of claim 1, further comprising the step of selecting a stretch value.

3. The method of claim 2, further comprising the step of calculating said completion times for each of said job requests as a function of said selected stretch value.

4. The method of claim 3, wherein said corresponding deadline equals said arrival time of said job request plus the product of said selected stretch value times said processing time of said job request.

5. The method of claim 4, wherein said scheduling step further comprises scheduling said job requests, according to an "earliest deadline first" arrangement.

6. The method of claim 5, wherein said stretch value is a feasible stretch value if, at said stretch value, said completion time of each and every said job request is prior to said corresponding deadline for each said job request.

7. The method of claim 6, further comprising the step of repeatedly adjusting said stretch value until said stretch value is a feasible stretch value.

8. The method of claim 7, wherein said feasible stretch value further comprises an optimal feasible stretch value, said method further comprising the step of adjusting said selected stretch value until a feasible stretch value is found, said feasible stretch value corresponding to the smallest feasible stretch value that permits said each and every job request to have a completion time prior to said deadline of said job request.

9. The method of claim 8, wherein said adjusting step further comprises adjusting said selected stretch value by doubling said selected stretch value.

10. The method of claim 9, wherein said adjusting step further comprises performing a binary search for said optimal feasible stretch value after said controller determines that said feasible stretch value falls between said selected stretch value and double said selected stretch value.

11. The method of claim 1, wherein said plurality of job requests further comprises a set having n number of job requests, wherein n is an integer.

12. The method of claim 11, wherein said integer n has a value that is equal to a total number of job requests processed by said server system.

13. The method of claim 12, wherein said integer n has a value that is equal to a total number of job requests processed by said server system in a pre-determined time period.

14. The method of claim 11, further comprising the step of determining an on-line stretch value, wherein said on-line stretch value is the product of the square root of a ratio times said feasible stretch value, said ratio equal to a maximum processing time for a job request within said set divided by a minimum processing time for a job request within said set.

15. The method of claim 11, wherein said integer n has a value that is less than a total number of job requests processed by said server system.

16. The method of claim 1, wherein said processing time of each of said job requests corresponds to a pre-determined time interval.

17. The method of claim 1, wherein said processing time further comprises a value corresponding to the product of a plurality of bytes of data and a pre-determined time interval.

18. The method of claim 1, wherein said processing time further comprises a value corresponding to the product of said plurality of bytes of data and a pre-determined time interval, plus an additional pre-determined time period.

19. A server system for scheduling a plurality of job requests, said system comprising:
   a means for determining a feasible stretch value; and
   a means for scheduling each of said job requests based on said feasible stretch value, said scheduling means coupled to said determining means.

20. The server system of claim 19, further comprising;
   a processing means for tracking an arrival time and a processing time for each of said plurality of job requests, said processing means further configured to calculate a deadline corresponding to each of said plurality of job requests.

21. The server system of claim 20, wherein said determining means is further configured to select a stretch value.

22. The server system of claim 21, wherein said determining means is further configured to calculate deadlines for each said job request at said selected stretch value.

23. The server system of claim 22, wherein said deadlines equal said arrival time of said job request plus the product of said selected stretch value times said processing time of said job request.

24. The server system of claim 23, wherein said scheduling means schedules said job requests, according to an "earliest deadline first" arrangement.

25. The server system of claim 24, wherein said stretch value is a feasible stretch value if, at said stretch value, a completion time of each and every said job request is prior to said corresponding deadline for each said job request.

26. The server system of claim 25, wherein said determining means repeatedly adjusts said stretch value until said stretch value is a feasible stretch value.

27. The server system of claim 26, wherein said determining means adjusts said selected stretch value by doubling said selected stretch value.

28. The server system of claim 27, wherein said feasible stretch value further comprises an optimal feasible stretch value, and wherein said determining means is further configured to adjust said selected stretch value until said optimal feasible stretch value is determined, such that said optimal feasible stretch value corresponds to the smallest feasible stretch value that permits said each and every job request to have a completion time prior to said deadlines.

29. The server system of claim 28, wherein said determining means performs a binary search for said optimal feasible stretch value after said determining means determines that said feasible stretch value falls between said selected stretch value and double said selected stretch value.

30. The server system of claim 28, wherein said integer n has a value that is less than a total number of job requests processed by said server system.

31. The server system of claim 20, wherein said plurality of job requests further comprises a set having n number of job requests, wherein n is an integer.

32. The server system of claim 31, wherein said integer n has a value that is equal to a total number of job requests processed by said server system.

33. The server system of claim 32, wherein said integer n has a value that is equal to a total number of job requests processed by said server system in a pre-determined time period.

34. The server system of claim 31, wherein said determining means is further configured to determine an on-line stretch value, and wherein said on-line stretch value corresponds to the product of the square root of a ratio times said feasible stretch value, said ratio equal to a maximum processing time for a job request within said set divided by a minimum processing time for a job request within said set.

35. The server system of claim 20, wherein each of said job requests comprises a plurality of bytes of data, and wherein said processing time of each of said job requests corresponds to the product of said plurality of bytes of data times a pre-determined time interval.

36. The server system of claim 35, wherein said processing time of each of said job requests corresponds to the product of said plurality of bytes of data and a pre-determined time interval, plus an additional pre-determined time period.

37. The server system of claim 20, wherein said processing time of each of said job requests corresponds to a pre-determined time interval.

38. A server system for scheduling and processing a plurality of job requests from a plurality of clients, said system comprising:

an admission control circuit configured to store an arrival time and a processing time of each of said job requests;

a controller coupled to said admission control circuit and configured to determine a feasible stretch value, such that each of said job requests are served within a corresponding deadline; and a scheduler for scheduling each of said job requests based on said plurality of deadlines.

39. The server system of claim 38, wherein said controller is further configured to estimate a feasible stretch value.

40. The server system of claim 39, wherein said corresponding deadline equals said arrival time of said job request plus the product of said estimated stretch value times said processing time of said job request.

41. The server system of claim 40, wherein said scheduler schedules said job requests according to an earliest deadline first arrangement.

42. The server system of claim 38, wherein said processing time of each of said job requests corresponds to a pre-determined time interval.

43. A server system for scheduling and processing a plurality of job requests from a plurality of clients, said system comprising:

an admission control circuit configured to store an arrival time and a processing time of each of said job requests;

a controller coupled to said admission control circuit and configured to determine a feasible stretch value, such that each of said job requests are served within a corresponding deadline;

a scheduler for scheduling each of said job requests based on said plurality of deadlines;

said plurality of job requests comprising a set having n number of job requests, wherein n is an integer.

44. The server system of claim 43, wherein said controller is further configured to determine an on-line stretch value, and wherein said on-line stretch value is the product of the square root of a ratio times said feasible stretch value, said ratio equal to a maximum processing time for a job request within said set divided by a minimum processing time for a job request within said set.

45. The server system of claim 44, wherein said integer n has a value that is equal to a total number of job requests processed by said server system in a pre-determined time period.

* * * * *